United States Patent [19]

Ruckle et al.

[11] Patent Number: 4,982,893
[45] Date of Patent: Jan. 8, 1991

[54] DIFFUSION BONDING OF TITANIUM ALLOYS WITH HYDROGEN-ASSISTED PHASE TRANSFORMATION

[75] Inventors: Duane L. Ruckle, Mesa; Thomas E. Strangman, Phoenix; Robert J. Keiser, Cave Creek, all of Ariz.

[73] Assignee: Allied-Signal Inc., Phoenix, Ariz.

[21] Appl. No.: 394,708

[22] Filed: Aug. 15, 1989

[51] Int. Cl.$^5$ .................. B23K 20/02; B23K 20/16
[52] U.S. Cl. .................. 228/220; 228/193; 228/263.21; 148/11.5 F
[58] Field of Search .......... 228/193, 220, 157, 263.21, 228/265; 148/11.5 F, 133

[56] References Cited

U.S. PATENT DOCUMENTS

| | | | |
|---|---|---|---|
| 2,892,742 | 6/1959 | Zwicker et al. | 148/133 X |
| 3,106,773 | 10/1963 | Jaffe et al. | 228/194 |
| 3,197,858 | 8/1965 | Feduska et al. | 228/193 |
| 3,241,230 | 10/1962 | Batista et al. | 228/193 |
| 3,417,461 | 12/1965 | Wells et al. | 228/194 |
| 3,680,197 | 8/1972 | Blum et al. | 228/193 |
| 3,686,041 | 2/1971 | Lee | 148/11.5 F |
| 3,713,207 | 1/1973 | Ruckle et al. | 228/263.21 X |
| 3,769,101 | 10/1973 | Woodward | 228/194 X |
| 3,920,175 | 11/1975 | Hamilton et al. | 228/193 X |
| 4,034,906 | 7/1977 | Carison et al. | 228/194 |
| 4,088,258 | 5/1978 | Regalbuto | 228/193 |
| 4,263,375 | 4/1981 | Elrod | 228/193 X |
| 4,415,375 | 11/1983 | Lederich et al. | 148/133 X |
| 4,452,389 | 6/1984 | Amin | 228/193 X |
| 4,505,764 | 3/1985 | Smickley et al. | 148/133 |
| 4,603,808 | 8/1986 | Stacher | 228/173.2 |
| 4,612,066 | 9/1986 | Levin et al. | 148/20.3 |
| 4,624,714 | 11/1986 | Smickley et al. | 148/133 X |
| 4,655,855 | 4/1987 | Levin et al. | 148/20.3 |
| 4,808,250 | 2/1989 | Froes et al. | 148/133 X |

Primary Examiner—Kenneth J. Ramsey
Attorney, Agent, or Firm—Robert A. Walsh; James W. McFarland

[57] ABSTRACT

A piece of a titanium-base alloy having an elevated temperature phase transformation is diffusion bonded to a second phase at an accelerated rate or reduced temperature, as compared with conventional diffusion bonding, by manipulating the phase transformation with an alloying element that can be readily introduced into, and removed from, the titanium piece. The introduction of hydrogen into the titanium alloy reduces the temperature of the phase transformation. The titanium alloy can be repeatedly cycled through the phase transformation before or during bonding, by the introduction and removal of hydrogen, to reduce the flow stress through transformation plasticity. Alternatively, the titanium alloy may be loaded with hydrogen to reduce the phase transformation temperature, increasing the fraction of the more deformable phase and then reducing the flow stress of the alloy at the diffusion bonding temperature.

9 Claims, 1 Drawing Sheet

DIFFUSION BONDING OF TITANIUM ALLOYS WITH HYDROGEN-ASSISTED PHASE TRANSFORMATION

BACKGROUND OF THE INVENTION

This invention relates generally to the joining of metals, and, more particularly, to diffusion bonding of nonferrous metals at elevated temperatures and pressures.

In many applications of metals, a metal piece must be joined to another metal piece to create a useful structure. It has long been a common practice to join metal pieces with conventional fasteners such as bolts, rivets, or screws, or with specialized fasteners. Metal pieces are also joined by welding or brazing, using a filler metal between the joined pieces.

These conventional techniques are usually successful in joining the pieces, but may not produce the strongest and most durable joint possible because of stress concentrations, irregularities, and incomplete bonding at the interface between the pieces joined. The stress concentrations, irregularities and incomplete bonds often act as the points of initiation of cracks and thence failure during service, so that the joint becomes the primary source of weakness in the structure.

As a solution to the joining problem for structures that are to be used at room temperature or low elevated temperatures, specialized organic adhesives such as epoxies have been developed. The pieces to be joined are essentially glued together by the adhesive. The adhesive spreads the loads transmitted through the joint across the entire area of the joint, reducing the incidence of failure due to stress concentrations. However, the strength of such adhesives falls rapidly with increasing temperature, so that pieces to be used at temperatures greater than about 250° C. cannot be joined with such adhesives.

Some metals may be joined together by cleaning a smooth surface on each and subsequently pressing them together under pressure, in a nonreactive environment and at elevated temperature. This process is known as diffusion bonding. The material in the two pieces interdiffuse slightly, and the grains of the two pieces grow across the interface, so that in reality the interface disappears. When two pieces of the same or similar composition and microstructure are diffusion bonded together properly, it is often impossible to discern where the interface was, even with high power microscopes. Moreover, the joint becomes as strong and durable as the underlying pieces being bonded, and is not a favored site for failure initiation. This diffusion bonding process is therefore highly preferred where it can be used to advantage.

Not all metals can be readily diffusion bonded For example, a tough oxide scale at the surface, as found on aluminum alloys, prevents interdiffusion. The oxide can sometimes be broken by mechanical working and/or chemical cleaning, but a remnant typically remains in the interfacial region as a source of defects In some cases, nature has provided metals having a desirable combination of properties useful in particular applications, coupled with the ability to be diffusion bonded. One commercially more important of such metals is titanium and its alloys. Titanium dissolves its own oxide at elevated temperatures, removing this impediment to the diffusion bonding process.

A sufficient pressing pressure must be applied for a period of time in order to provide enough plastic flow or deformation to remove irregularities and voids at the interface, and force the two pieces into full contact along the entire interface. The titanium alloys are often selected because of their high strength at elevated service temperatures, but this high strength acts to slow the diffusion bonding operation at a selected temperature by reducing the rate of plastic flow necessary to achieve full bonding. The rate of flow can be increased by increasing the bonding pressure, but this approach reduces the size of pieces that can be bonded by use of a mechanical bonding press of a particular force capacity Alternatively, if the bonding pressure if provided by isostatic pressing, more complex and expensive equipment is required to achieve higher pressures.

Normally, effective diffusion bonding temperatures for titanium alloys are relatively high, to increase the rate of diffusion so that voids can be eliminated and bonding achieved without excessive pressure or excessive bonding time. For conventional alpha-beta titanium alloys such as Ti-6Al-4V, diffusion bonding temperatures are usually selected which range from about the beta transus temperature (about 995° C.) to well below the beta transus temperature (about 870° C.)

These high bonding temperatures are often undesirable, since they can cause phase coarsening and poor mechanical properties in the finished article. High bonding temperatures are also undesirable when reinforcing particles or fibers must be included within a diffusion bonded article as in fabrication of metal-matrix composites. In this case, high bonding temperatures can cause reaction between the included particles or fibers and the matrix metal, severely reducing the strength of the finished composite article Lowering of diffusion bonding temperatures is an important goal in further improving diffusion bonding operations, There have been several approaches to enhancing diffusion bonding :f titanium alloys. In one, the alloy composition is changed to reduce elevated temperature flow strength. Bonding is thereby enhanced, but the ultimate usefulness of the bonded structure is reduced In another approach, bonding is accelerated by coating the surfaces to be bonded with a fugitive coating that accelerates bonding, but then diffuses away into the bulk of the metal during the bonding operation. This method introduces undesired impurities into the final structure, particularly near to the bond line.

In still another approach described in U.S. Pat. No. 3,713,207, a specially prepared thin, fine-grained, superplastic foil interlayer is placed between the pieces to be bonded. The superplastic properties of the foil reduce bonding pressures and/or temperatures However, preparation of the foil material is often difficult or prohibitively expensive, making this approach undesirable for many diffusion bonding needs.

Accordingly, there exists a continuing need for an improved technique for bonding pieces of titanium and other types of alloys that can inherently be diffusion bonded. Such a technique should provide for reduced bonding temperatures and/or pressures, and should not adversely affect the performance of the final bonded structure, as by leaving an incompletely bonded joint, residue, or impurities. The present invention fulfills this need, and further provides related advantages.

SUMMARY OF THE INVENTION

The present invention resides in a process for bonding together two pieces of metal, at least one of which is preferably a titanium alloy. Operable titanium alloys include the conventional structural titanium alloys such as the alpha-beta alloy Ti-6Al-4V, and also advanced intermetallic alloys such as titanium aluminides of the form Ti$_3$Al, all of which have an operable phase transformation at elevated temperatures. The process permits accelerated bonding, without introducing alloying elements or contaminants that remain in the vicinity of the joint to interfere with the strength and durability of the joint in service The process can be implemented in any of several ways, depending upon the availability of furnaces and presses.

In accordance with the invention, a process for bonding together two pieces of metal comprises the steps of furnishing the two pieces of metal to be bonded at least a first piece of which is selected from the group consisting of titanium and an alloy of titanium having a phase whose stability is modified by the presence of hydrogen, introducing hydrogen into at least the first piece of metal to reduce its flow stress at an elevated bonding temperature, and pressing the two pieces together under an applied bonding pressure and at the elevated bonding temperature.

Upon solidifying from the melt, pure titanium exhibits a body-centered-cubic crystal structure, termed the beta phase. As the titanium is cooled to a temperature below about 880° C., the beta phase transforms to a hexagonalclose-packed crystal structure, termed the alpha phase, which is stable down to room temperature. Many titanium alloys also exhibit such a beta to alpha transformation, and the metallurgy of most of the commercial titanium alloys is related to the selection of particular chemical compositions and processing to achieve desirable physical properties. The temperature above which the alpha phase cannot exist is termed the beta transus, and the exact value of the beta transus is dependent upon the alloying elements present in the titanium alloy For example, the beta transus of the commercially important titanium alloy Ti-6Al-4V is about 995° C.

A titanium-based alloy may be entire alpha phase when cooled below the beta transus temperature entirely beta phase, or a mixture of alpha and beta phases. The beta phase can exist below the beta transus temperature because certain alloying elements stabilize the beta phase, and due to the slow reaction kinetics of the beta to alpha transformation.

In the diffusion bonding operation, two pieces of metal are cleaned and are placed together in a face to face relation. Pressure is applied perpendicular to the interfacial plane, and any surface irregularities are flattened out under the influence of the pressure. As the irregularities are flattened, the degree of interfacial contact increases, with a consequent decrease in the amount of open space or porosity at the interfacial joint. Continued pressure results in removal of the porosity and voids at the interface by a combination of plastic flow and diffusion until the interface is sound and without porosity, Atoms diffuse across the interface during this treatment, effectively removing traces of the interface if the bonding is accomplished properly.

Thus, to achieve good diffusion bonding, there should be both a low resistance to plastic flow in the pieces being bonded, to eliminate surface irregularities, and a high rate of diffusion to eliminate porosity at the interface during the terminal stages of bonding. It might be expected that these objectives could be best attained by accomplishing diffusion bonding at as high a temperature as possible, just below the melting point of the alloy. However, diffusion bonding of titanium alloys is normally accomplished at a temperature below the beta transus temperature, and often just below that temperature. Many titanium alloys exhibit superplastic flow at temperatures below the beta transus. In superplastic flow, large strains can be achieved with low applied stresses, permitting the removal of a major part of the surface irregularities and residual porosity by plastic flow rather than by the slower diffusional processes. Also, if the titanium alloy is heated above the beta transus, the structure becomes entirely beta phase. The flow stress of the beta phase is less than that of the alpha phase material, increasing the rate of bonding. Unfortunately, the beta phase alloy is susceptible to rapid coarsening of the grains in the microstructure, with the result that the final piece that has been bonded above the beta transus exhibits poor properties at lower temperatures.

The introduction of hydrogen into the metal alloy as a solute lowers the temperature of the beta transus, because hydrogen is a beta stabilizer. The result of lowering the beta transus temperature is to increase the amount of beta phase present at any selected temperature. The increased amount of beta phase present can be used directly to accelerate diffusion bonding, since beta phase has a lower flow stress and higher self-diffusion rate than alpha phase, at diffusion bonding temperatures.

In this direct approach, hydrogen is introduced under pressure to the pieces being diffusion bonded, during the diffusion bonding operation. A portion of the alpha phase present transforms to the beta phase due to the introduction of the beta phase stabilizer hydrogen. Because the beta phase has a lower flow stress than the alpha phase at a selected temperature, a fixed applied diffusion bonding pressure results in an accelerated rate of plastic flow at the diffusion bonding interface and more rapid bonding. The diffusion dependent portion of the diffusion bonding operation is also accelerated, as the beta phase has a greater self diffusion (or bulk diffusion) rate than the alpha phase. The effect of the introduction of hydrogen into the pieces during diffusion bonding is to lower the required diffusion bonding temperature to achieve a desired bonding rate. The temperature reduction is significant, inasmuch as the phases would otherwise tend to coarsen during higher temperature diffusion bonding treatments, an undesirable result that impairs the mechanical properties of the completed structure. The structure bonded by the present approach has a finer finished microstructure than achieved by normal diffusion bonding.

The hydrogen can also be charged into the metallic piece prior to the initiation of diffusion bonding, in a precharging step. In this approach, the piece to be elevated temperature. A pressure of hydrogen is applied, so that the hydrogen diffuses into the piece to the extent possible. The piece is cooled, with the pressure of hydrogen continuously applied. For some alloys, it is necessary to limit the amount of hydrogen introduced into the piece to be bonded to avoid excessive formation of hydrides which could lead to cracking of the piece. The piece charged with hydrogen is then transferred to a diffusion bonding furnace, assembled with the other pieces to be bonded, and diffusion bonded under an applied pressure and at the diffusion bonding temperature. Care must be taken to prevent the hydrogen from diffusing out of the solid pieces during the diffusion bonding operation This may be accomplished by applying a partial pressure of hydrogen to the pieces being bonded, or by providing a diffusion barrier coating to the pieces.

The introduction and removal of hydrogen can be accomplished prior to commencing diffusion bonding, to achieve a reduced alpha grain size in the piece to be subsequently diffusion bonded. The reduced alpha grain size results in an increased rate of superplastic flow at a selected pressing pressure during the diffusion bonding operation. The increased rate of flow accelerates the plastic flow-dependent portion of the diffusion bonding operation. The finer grain size also leads to an increased rate of grain boundary-dependent mass diffusion, accelerating the diffusion-dependent portion of the diffusion bonding operation.

The increased amount of beta phase induced by the presence of hydrogen can also be used indirectly to accelerate diffusion bonding. In the indirect method, hydrogen is alternately diffused into the metal piece and removed from the metal piece while the metal piece is held at an elevated temperature less than that of the beta transus when no hydrogen is present, with the result that the structure of the metal piece alternates between a lesser amount of beta phase (when no or a low level of hydrogen is present) and a greater amount of beta phase (when a substantial amount of hydrogen is present).

The introduction and removal of hydrogen is accomplished concurrently with the application of a diffusion bonding pressure, at the diffusion bonding temperature. In this case, the introduction and removal of hydrogen is accomplished cyclically, with hydrogen introduced and then removed while diffusion bonding pressure is applied. The hydrogen introduction and removal is repeated at least several times while the diffusion bonding proceeds. The hydrogen introduced in this manner also lowers the beta transus temperature, which leads to an increase in the fraction of beta phase present (when the hydrogen level is high) and an increase in the fraction of alpha phase present (when the hydrogen level is low). Under the influence of the applied pressure, the grains are deformed even as they are formed, leading to a more efficient deformation process that accelerates the flow-dependent portion of the diffusion bonding operation. This phenomenon is a form of transformation induced plasticity. The diffusion dependent portion of the diffusion bonding operation is also accelerated, due to the increased amount of grain boundary area at various stages of the hydrogen cycling.

Hydrogen is a particularly useful solute to be used to alter the structure of the alloys in the diffusion bonding operation. The hydrogen is a strong beta phase stabilizer, so that its introduction and removal at constant temperature, can significantly alter the microstructure by changing the relative amounts of beta and alpha phase at a temperature below the normal, hydrogen-free beta transus, Hydrogen diffuses rapidly at elevated temperature through titanium and other metals wherein the solubility of hydrogen in the metal is relatively high. The hydrogen may therefore be introduced rapidly by placing the metal piece into a pressure chamber and applying a pressure of hydrogen. The hydrogen is also removed rapidly by removing the hydrogen pressure and allowing the hydrogen to diffuse out of the metal piece, or applying a vacuum to accelerate hydrogen removal.

It is important to be certain that the hydrogen has been removed substantially completely at the end of the diffusion bonding operation, as hydrogen can embrittle the diffusion bonded piece at lower temperatures, or even diffuse to adjacent pieces and embrittle them. Fortunately, the introduction and removal of hydrogen at elevated temperatures is essentially reversible, if accomplished properly. The final removal step must be accomplished above the temperature of formation of hydrides, which are solid, hydrogen-containing compounds of titanium or the alloying elements that are formed when a hydrogen-charged piece is cooled below the formation temperature of the particular hydride. The hydrides themselves may be harmful to mechanical properties, and also can serve as the source of a later introduction of mobile hydrogen to the metallic lattice upon reheating the bonded structure.

The introduction of hydrogen can also be considered from the standpoint of when the hydrogen is introduced. Thus, a process for bonding together two pieces of metal comprises the steps of furnishing the two pieces of metal to be bonded, at least a first piece of which is selected from the group consisting of titanium or an alloy of titanium, introducing hydrogen into at least the first piece of metal to reduce its flow stress at an elevated bonding temperature, and pressing the two pieces together under an applied bonding pressure and at the elevated bonding temperature, the step of introducing hydrogen to be completed prior to beginning the step of pressing.

In another approach, a process for bonding together two pieces of metal comprises the steps of furnishing the two pieces of metal to be bonded, at least a first piece of which is selected from the group consisting of titanium or an alloy of titanium, introducing hydrogen into at least the first piece of metal to reduce its flow stress at an elevated bonding temperature, and pressing the two pieces together under an applied bonding pressure and at the elevated bonding the temperature, the step of introducing hydrogen to be accomplished concurrently with the step of pressing.

Hydrogen can be introduced either under a constantly applied pressure to charge the pieces, or in an alternating fashion to enhance transformation induced plasticity. The flow stress of the piece is reduced through the increase in the fraction of beta phase present, when the hydrogen pressure is constantly applied, or through the alternating transformations between the alpha and beta phases, under the alternating application of hydrogen pressure.

The approach of the present invention does not preclude post-bonding procedures. For example, after bonding, the structure can be heat treated by conventional procedures to achieve particular strength or durability levels. The structure can be machined or otherwise mechanically processed. Once the hydrogen is substantially fully removed from the bonded parts, it may be treated or processed. However, the microstructure of the bonded parts, in the as-bonded condition, is superior to that of conventional diffusion bonded structure, in that the microstructure is finer.

At least one of the pieces to be diffusion bonded must be susceptible of this treatment, for the present approach of hydrogen-assisted diffusion bonding to be operable. Preferably, both pieces to be bonded at an interface can be treated by this approach for optimal results. However, even if only one of the pieces is susceptible, an improvement in the diffusion bonding is achieved.

The diffusion bonding process of the invention is operable with titanium alloys having a beta transus. It is also operable with other alloys, such as zirconium alloys, having a similar elevated temperature phase transformation that is strongly affected by the introduction of the hydrogen solute.

Although other solutes can have the same effect as hydrogen in modifying the beta transus, it is presently believed that hydrogen must be used as the solute to achieve the beneficial results of the invention. Other solutes cannot diffuse with the rapidity of hydrogen, or be reversibly introduced and removed.

It should now be appreciated that the diffusion bonding process of the present invention presents a significant advance in the art of bonding together alloys having an elevated temperature phase transformation sensitive to the presence of a hydrogen solute. The present approach permits accelerated bonding of titanium and related alloys, without deleterious effects on the final bonded structure. Indeed, the final microstructure is typically enhanced after the hydrogen-assisted diffusion bonding operation, as compared with that produced by conventional diffusion bonding. Other features and advantages of the present invention will be apparent from the following more detailed description, taken in conjunction with the accompanying drawings, which illustrate, by way of example, the principles of the invention.

DETAILED DESCRIPTION OF THE PREFERRED EMBODIMENTS

Figure 1:
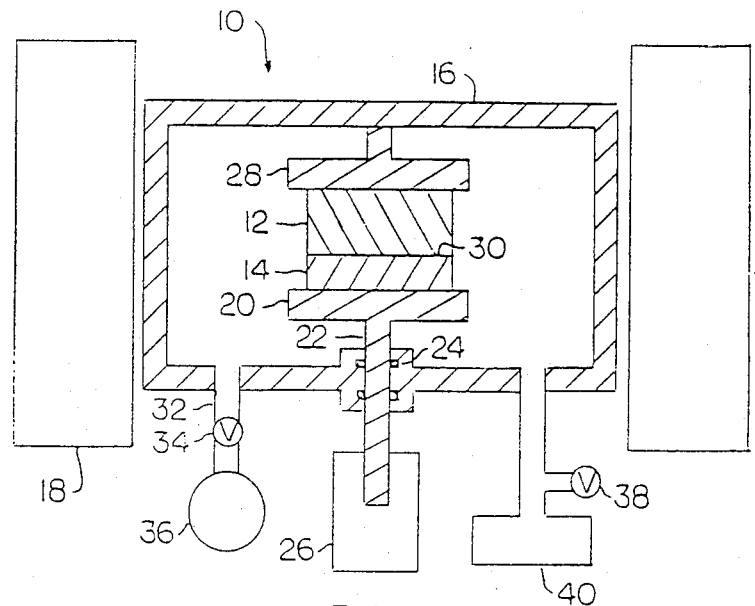
FIG. 1 is a diagrammatic side sectional view of a diffusion bonding apparatus.
Figure 2:
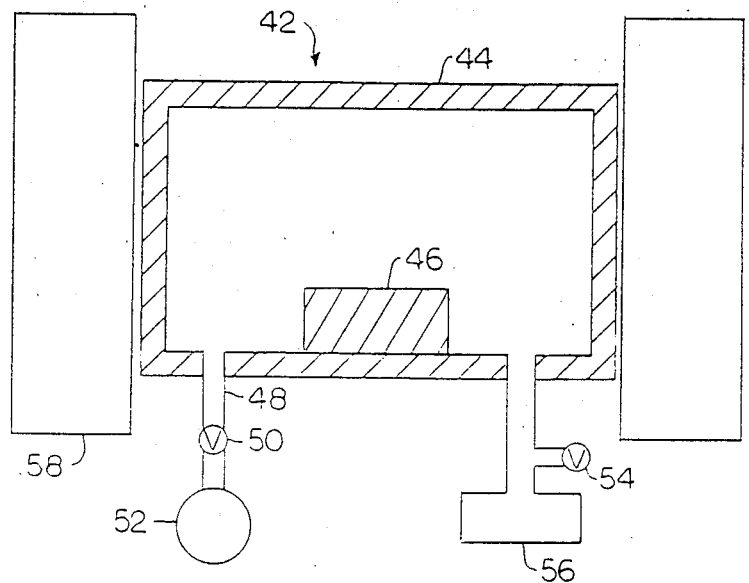
FIG. 2 is a diagrammatic side sectional view of a hydrogen treatment furnace.

The present invention is embodied in a process for diffusion bonding pieces of metal, and the pieces so bonded. By way of background and so that the context of use of the invention may be understood, FIGS. 1 and 2 illustrate the apparatus used in conjunction with the process of the invention. FIG. 1 illustrates a diffusion bonding apparatus 10 for diffusion bonding together a first piece of metal 12 and a second piece of metal 14. The apparatus 10 includes a chamber 16 that may, for the practice of some embodiments, be pressurized and/or evacuated. The pieces 12 and 14 are contained within the chamber 16 and are heated by any appropriate method In the illustrated apparatus 10 the heating is accomplished by placing the chamber 16, and the pieces 12 and 14 contained therein, into a controllable furnace 18.

Within the chamber 16, the pieces 12 and 14 are supported by a movable platen 20, which is supported on a piston 22 that extends through seals 24 in the wall of the chamber 16, to the exterior of the chamber 16. The piston 22 is moved by force application unit 26, which is typically either a mechanical motor or a hydraulic ram, to apply a compressive force to the pieces 12 and 14. The compressive force transmitted to the pieces 12 and 14 through the platen 20 is reacted against a stationary platen 28. The combination of the furnace 18 and the force application unit 26 thus permit a compressive force to be applied to an interface 30 between the pieces 12 and 14, at a selected elevated temperature. One of the limits of any such diffusion bonding apparatus 10 is the force (as in pounds) that is available from the force application unit 26. For any particular such unit 26, the less compressive pressure (as in pounds per square inch of interface 30) required to complete the diffusion bonding operation, the greater is the size of the pieces 12 and 14 that may be bonded, where the size of the pieces 12 and 14 is measured in terms of the area of the interface 30. It is therefore desirable to minimize the compressive pressures required for bonding, to reduce the size of the costly unit 26. Similarly, the shorter the time required to complete the bonding operation, the more throughput that may be achieved in the apparatus 10. Thus, metallurgical techniques to decrease the compressive pressure required and shorten the bonding time can reduce the capital costs of the apparatus 10. In addition, techniques which result in lower bonding temperatures are beneficial in providing refined microstructures in the finished articles.

In some of the embodiments to be described, a continuous or cyclically alternating gaseous hydrogen pressure is applied to the pieces 12 and 14, concurrently with the heating and application of compressive force. To provide the hydrogen, a hydrogen line 32 communicates with the interior of the chamber 16. Hydrogen pressure is regulated by a hydrogen valve 34 in the line 32, which regulates the flow of hydrogen from a gas supply 36. The gas supply 36 will include at least a partial pressure of hydrogen gas, but may also include an inert gas to reduce the possibility of an explosive detonation of hydrogen in the event of a gas leak. Hydrogen pressure can be reduced or removed from the interior of the chamber 16 through a relief valve 38. A vacuum may optionally be drawn on the interior of the chamber 16 by a vacuum pump 40, if it is desired to withdraw all traces of hydrogen from the interior of the chamber 16. By manipulating the valves 34 and 38 and selectively operating the pump 40, the hydrogen pressure within the chamber 16 can be maintained steady, increased, decreased, or reduced to zero, as required In others of the embodiments to be described, hydrogen is charged into one or both of the pieces 12 and 14 prior to their being loaded into the apparatus 10. This pre-bonding charging is accomplished in a charging apparatus 42, illustrated in FIG. 2. The apparatus 42 includes a charging chamber 44 into which a piece of metal 46 is placed. To provide the hydrogen, a hydrogen line 48 communicates with the interior of the chamber 44. Hydrogen pressure is regulated by a hydrogen valve 50 in the line 48, which regulates the flow of hydrogen from a gas supply 52. The gas supply 52 will include at least a partial pressure of hydrogen gas, but may also include an inert gas to reduce the possibility of an explosive detonation of hydrogen in the event of a gas leak. Hydrogen pressure can be reduced or removed from the interior of the chamber 44 through a relief valve 54. A vacuum may optionally be drawn on the interior of the chamber 16 by a vacuum pump 56, if it is desired to withdraw all traces of hydrogen from the interior of the chamber 44. By manipulating the valves 50 and 54 and selectively operating the pump 56, the hydrogen pressure within the chamber 44 can be maintained steady, increased, decreased, or reduced to zero, as required.

The pieces of metal 46 contained within the chamber 44 can be heated by any operable means. In the preferred embodiment, the entire chamber 44, as well as the pieces of metal 46, are placed into a furnace 58. With this approach, the pieces of metal 46 can be given programmed hydrogen charging treatments prior to their diffusion bonding in the apparatus 10. The diffusion bonding apparatus 10 could be used for the charging treatments, but in most instances the apparatus 10 is sufficiently costly that it would not be used to accomplish charging treatments that can be performed in the less costly charging apparatus 42. In addition to the bonding method of apparatus 10, hot isostatic pressing or any other suitable means of diffusion bonding may be used to bond articles pre-charged with hydrogen in apparatus 42.

Several embodiments of the invention are presently known, with the first embodiment described below being the most preferred at the present time.

In the first embodiment, the titanium (as used herein, "titanium" includes pure titanium and alloys of titanium and other elements) pieces to be bonded are placed into the charging apparatus 42 and subjected to a cycle of pressurizing and depressurizing the chamber 44 with hydrogen gas. Such cyclic treatments are known to alter the microstructure, as disclosed in U.S. Pat. No. 4,505,764, whose disclosure is herein incorporated by reference. Hydrogen gas diffuses into the pieces to charge them with hydrogen during the pressurizing part of the cycle, and diffuses out of the pieces to reduce their hydrogen content during the depressurizing portion of the cycle. The cycle of pressurizing and depressurizing is conducted with the pieces at a constant temperature slightly below the beta transus temperature, but above the temperature at which hydrides form. During this cyclic treatment, the beta phase is stabilized when the chamber is pressurized, increasing the fraction of beta phase present in the pieces. Conversely, the relative fraction of alpha phase is increased when the hydrogen is removed. The cyclic change in the fractions of the phases present has the effect of refining the alpha grain size after the cyclic treatment is complete, and the pieces are returned to ambient temperature. At the completion of the cyclic treatment, the residual hydrogen gas may be removed by the pump 56 prior to cooling below the temperature at which hydrides form.

After the completion of the cyclic treatment in the apparatus 42, the pieces to be bonded are placed into the apparatus 10, at the locations indicated by the pieces 12 and 14. The temperature of the pieces is increased to the diffusion bonding temperature, and a pressure applied perpendicular to the interface 30 by the platens 20 and 28. After a time sufficient to achieve complete diffusion bonding, the pressure is removed, the temperature reduced to ambient, and the bonded pieces removed. Alternatively, the pre-treated pieces may be consolidated by hot isostatic pressing.

In a second embodiment, a procedure similar to that of the first embodiment is followed, except that the gas pressure applied when the pieces are within the apparatus 42 is not cyclic, but is generally steady and constant. The hydrogen pressure stabilizes the beta phase and increases its fraction of the total material. The pieces are then cooled to ambient temperature, so that solid solution hydrogen is present within the pieces. The hydrogen-loaded pieces are transferred to the apparatus 10 and diffusion bonded. Upon re-heating the pieces 12 and 14 within the apparatus 10, the hydrogen solute stabilizes the beta phase, and increases its relative fraction during the bonding operation. The beta phase flows more easily than does the alpha during the bonding operation, resulting in more rapid deformation consolidation at the interface.

In a third embodiment, the pieces 12 and 14 to be bonded are loaded directly into the bonding apparatus 10. The pieces are heated to the diffusion bonding temperature and a bonding pressure applied through the platens 20 and 28. The bonding temperature is below the beta transus temperature but above the temperature at which hydrides form. While the diffusion bonding pressure is applied through the platens 20 and 28, the chamber 16 is alternatively pressurized and depressurized multiple times with hydrogen. After bonding is complete, hydrogen is removed from the articles by applying a vacuum to the apparatus 10.

The introduction of hydrogen causes hydrogen to diffuse into the pieces 12 and 14, stabilizing the beta phase. Depressurization of the chamber by removing the hydrogen reduces the fraction of beta phase and increases the fraction of alpha phase. The cyclic change of the relative volume fractions of the phases, under the influence of the cyclic hydrogen pressure variation, assists plastic deformation in a manner similar to that of a transformation induced plasticity. The plastic flow component of the diffusion bonding is thereby accelerated. The diffusional component is also accelerated, due to the increased selfdiffusion coefficient rate of the beta phase. Upon completion of the bonding operation, the remaining hydrogen is removed from the pieces by evacuating the diffusion bonding chamber.

The fourth embodiment is similar to the third embodiment, in that the entire treatment is accomplished within the apparatus 10, and the charging apparatus 42 is not used. In the fourth embodiment, instead of cyclically pressurizing and depressurizing the chamber 16 with hydrogen, a relatively constant hydrogen pressure is introduced into the chamber concurrently with the application of pressure perpendicular to the interface 30 through the platens 20 and 28, and the heating to the diffusion bonding temperature. Hydrogen diffuses into the pieces 12 and 14 under the driving force of the hydrogen pressure in the chamber 16. The hydrogen in the pieces 12 and 14 stabilizes the beta phase, increasing its volume fraction at the diffusion bonding temperature. The diffusion bonding temperature is selected to be a temperature below the unpressurized beta transus temperature, but above the pressure at which hydrides form.

Using this approach, the rate of bonding is increased above that experienced for bonding at that temperature and applied platen pressure, but without applied hydrogen gas pressure, because the increased fraction of beta phase deforms more easily than does the corresponding amount of alpha phase, and because the beta phase has a greater self-diffusion rate than does the alpha phase at the same temperature. Both the deformation and diffusion components of diffusion bonding are thereby accelerated. Upon completion of the bonding operation, the hydrogen is removed by the application of a vacuum and the bonded pieces are cooled to room temperature.

Thus, the approach of the present invention provides an important new process for diffusion bonding titanium alloys and similar materials which are susceptible to the hydrogen induced transformation. The introduction of hydrogen, normally thought to be detrimental to parts because of the danger of hydrogen embrittlement, is reversible in the sense that the hydrogen can be removed by an elevated temperature vacuum treatment after bonding is complete. Although particular embodiments of the invention have been described for purposes of illustration, various modifications may be made without departing from the spirit and scope of the invention. Accordingly, the invention is not to be limited except as by the appended claims.

What is claimed is:

1. A process for bonding together two pieces of metal, comprising the steps of:
   furnishing the two pieces of metal to be bonded, at least a first piece of which is selected from the group consisting of titanium and an alloy of titanium;
   introducing hydrogen into at least the first piece of metal to reduce its flow stress at an elevated bonding temperature; and
   pressing the two pieces together under an applied bonding pressure and at the elevated bonding temperature, said step of introducing hydrogen to be accomplished concurrently with said step of pressing.

2. The process of claim 7, wherein said step of introducing is accomplished by pressing the two pieces together within a container pressurized with hydrogen gas.

3. The process of claim 7, wherein said step of introducing includes the substeps of alternately charging hydrogen gas into said pieces and removing hydrogen gas out of said pieces, concurrently with said step of pressing.

4. The process of claim 7, wherein the first piece is a titanium aluminide.

5. The process of claim 7, wherein both pieces of metal are selected from the group consisting of titanium and titanium alloys.

6. The process of claim 7, including the further step of:
   removing the hydrogen from the bonded pieces, said step of removing being accomplished after said step of pressing.

7. A process for bonding together two pieces of metal, comprising the steps of:
   furnishing the two pieces of metal to be bonded, at least a first piece of which is selected from the group consisting of titanium and an alloy of titanium;
   introducing hydrogen into at least the first piece of metal to reduce its flow stress at an elevated bonding temperature by alternatively charging hydrogen gas into said pieces and removing hydrogen gas out of said pieces; and then
   pressing the two pieces together under an applied bonding pressure and at the elevated bonding temperature.

8. A process for bonding together two pieces of metal comprising the steps of:
   furnishing the two pieces of metal to be bonded, at least a first piece of which is selected from the group consisting of titanium and an alloy of titanium;
   introducing hydrogen into at least the first piece of metal to reduce its flow stress at an elevated bonding temperature; and
   concurrently pressing the two pieces together under an applied bonding pressure and at the elevated bonding temperature.

9. A process for bonding together two pieces of metal comprising the steps of:
   furnishing the two pieces of metal to be bonded, at least a first piece of which is selected from the group consisting of titanium and an alloy of titanium;
   introducing hydrogen into at least the first piece of metal to reduce its flow stress at an elevated bonding temperature by alternately charging hydrogen gas into said pieces and removing hydrogen gas out of said pieces; and then
   pressing the two pieces together under an applied bonding pressure and at the elevated bonding temperature, said step of introducing hydrogen to be completed prior to beginning of said step of pressing.

* * * * *

UNITED STATES PATENT AND TRADEMARK OFFICE
CERTIFICATE OF CORRECTION

PATENT NO. : 4,982,893

DATED : January 8, 1991

INVENTOR(S) : Duane L. Ruckle and Thomas E. Strangman

It is certified that error appears in the above-identified patent and that said Letters Patent is hereby corrected as shown below:

In Column 11, Claim 2, line 1, change "7" to --1--;

Claim 3, line 1, change "7" to --1--;

Claim 4, line 1, change "7" to --1--;

Claim 5, line 1, change "7" to --1--;

Claim 6, line 1, change "7" to --1--.

Signed and Sealed this

Fifth Day of May, 1992

*Attest:*

DOUGLAS B. COMER

*Attesting Officer*  *Acting Commissioner of Patents and Trademarks*